(12) United States Patent
Lin et al.

(10) Patent No.: US 7,743,473 B2
(45) Date of Patent: Jun. 29, 2010

(54) FAST LOOSED BELT STRUCTURE

(75) Inventors: Chin-Liang Lin, Taipei (TW); Shail-Chen Yu, 2F, No.45, Alley5, Lane24, Sec.3, Tingzhou Rd., Taipei City (TW); Chia-Chang Chao, Taipei (TW)

(73) Assignees: Huntex Corporation, Taipei (TW); Shail-Chen Yu, Taipei (TW)

( * ) Notice: Subject to any disclaimer, the term of this patent is extended or adjusted under 35 U.S.C. 154(b) by 617 days.

(21) Appl. No.: 11/714,773

(22) Filed: Mar. 7, 2007

(65) Prior Publication Data

US 2008/0216291 A1 Sep. 11, 2008

(51) Int. Cl.
*B25B 25/00* (2006.01)

(52) U.S. Cl. ............... 24/71 ST; 24/68 CD; 24/909; 2/321

(58) Field of Classification Search .............. None
See application file for complete search history.

(56) References Cited

U.S. PATENT DOCUMENTS

| | | | | |
|---|---|---|---|---|
| 2,969,221 | A | * | 1/1961 | Harmes ............... 254/218 |
| 3,279,760 | A | * | 10/1966 | Bathum, Jr. ............... 254/376 |
| 4,155,537 | A | * | 5/1979 | Bronson et al. ........... 242/388.3 |
| 4,199,182 | A | * | 4/1980 | Sunesson ............... 24/68 CD |
| 4,542,883 | A | * | 9/1985 | Rutzki .................. 254/217 |
| 6,095,450 | A | * | 8/2000 | Jang .................. 242/388.5 |
| 6,654,987 | B1 | * | 12/2003 | Wu ................... 24/68 CD |
| 7,207,089 | B2 | * | 4/2007 | Hanson ............... 24/68 CD |
| 7,293,760 | B1 | * | 11/2007 | Chang .................. 254/218 |
| 7,510,168 | B1 | * | 3/2009 | Lin ..................... 254/218 |
| 2005/0177984 | A1 | * | 8/2005 | Huang ................. 24/68 CD |

FOREIGN PATENT DOCUMENTS

| TW | M254201 U | 1/2005 |
|---|---|---|
| TW | M256148 U | 2/2005 |

\* cited by examiner

*Primary Examiner*—Jack W. Lavinder
(74) *Attorney, Agent, or Firm*—Muncy, Geissler, Olds & Lowe, PLLC

(57) ABSTRACT

A belt structure includes a first housing, a second housing, a third housing and a belt. The two ends of the belt are respectively connected to the first housing and the third housing, which can be buckled together quickly. The second housing and the first housing are connected, so that a mechanism for fine tuning the belt can be formed through the gear, the driving element and the resisting element in the first and the second housing.

9 Claims, 4 Drawing Sheets

FAST LOOSED BELT STRUCTURE

FIELD OF THE INVENTION

The present invention is related to a fast loosed belt structure, and more particularly to a belt structure which has the capability of fast buckling and also the function of fine tuning.

BACKGROUND OF THE INVENTION

As first aid, a pressing belt is used to tighten against a human body, for example, during an injury, when the damaged limb might need to be tightened to stop bleeding. When any part of human body has a bleeding cut, it is called an external hemorrhage, such as, an incised wound on the wrist, an abrasion on the face or the lower leg, or a laceration of the arm. The bleeding causes the loss of blood and also the red blood cells, so that the oxygenation function of the human body will be reduced, and if the bleeding becomes very serious or out of control, it might cause shock, or even death. Therefore, stopping bleeding undoubtedly is the most important step when processing the injury in an accident. Generally, hemostasis methods may include pressure hemostasis, limb lift hemostasis, and pressure point hemostasis, and the tourniquet hemostasis is the last line of defense for limb hemostasis. The belt used for tourniquet hemostasis should be self-operating, quickly assembled, easily stored and obtained, conveniently adjusting the level of tightness, having a time alarm, combining multiple belts, and be inexpensive.

R.O.C. Patent Publication No. M256148 entitled "Improved tourniquet structure" disposes nylon fasteners located at the inner and outer sides of two ends of an elastic belt to form a tourniquet. However, when adjusting the level of tightness, this kind of tourniquet needs to be loosed first and re-bind again, so that it is inconvenient. Another disclosure is R.O.C. Patent Publication No. M254201 entitled "Buckled tourniquet", in which the tourniquet is an elastic belt with a saw plastic plate and a saw shrink box mounted thereon and is fixed through the engagement between the saw plastic plate and the saw shrink box. However, the adjustment of length is still inconvenient and the engagement might also be released by hitting. Therefore, these conventional disclosures still have the drawbacks of unstable engagement structure, uneasily adjusted length and lacking fine tuning capability.

SUMMARY OF THE INVENTION

Consequently, the object of the present invention is to provide a belt which can be fast buckled and has the function of fine tuning.

The present invention provides a belt structure including a first housing, a second housing, a third housing and a belt, wherein one end of the belt is fixed on a hollow axle pipe inside the first housing, and the other end extends through the third housing and is fixed by a pressing shaft, the first housing and the third housing are buckled through an engaging element and a buckling element, thereby a circular belt is formed. The second housing has an axle pillar for extending into the hollow axle pipe of the first housing, so that the second housing can turn by taking the axle pillar and the hollow axle pipe as the central axle. The hollow axle pipe has a gear respectively mounted at two ends thereof, the first housing has at least a resisting element mounted therein, and the second housing has at least a driving element mounted therein, so that through turning the second housing to force the driving element to drive the turning of the gear and through the resisting element disabling the gear from homing, a mechanism for fine tuning the tightness of the belt is achieved. When simultaneously moving the resisting element and the driving element to release the gear, the gear can go back to the original position. Then, through pressing the engaging element of the first housing, the third housing can be departed therefrom, so that a belt with the capability of fast buckling and the function of fine tuning is achieved.

BRIEF DESCRIPTION OF THE DRAWINGS

The foregoing aspects and many of the attendant advantages of this invention will be more readily appreciated as the same becomes better understood by reference to the following detailed description, when taken in conjunction with the accompanying drawings, wherein.

DESCRIPTION OF THE PREFERRED EMBODIMENT

Figure 1:
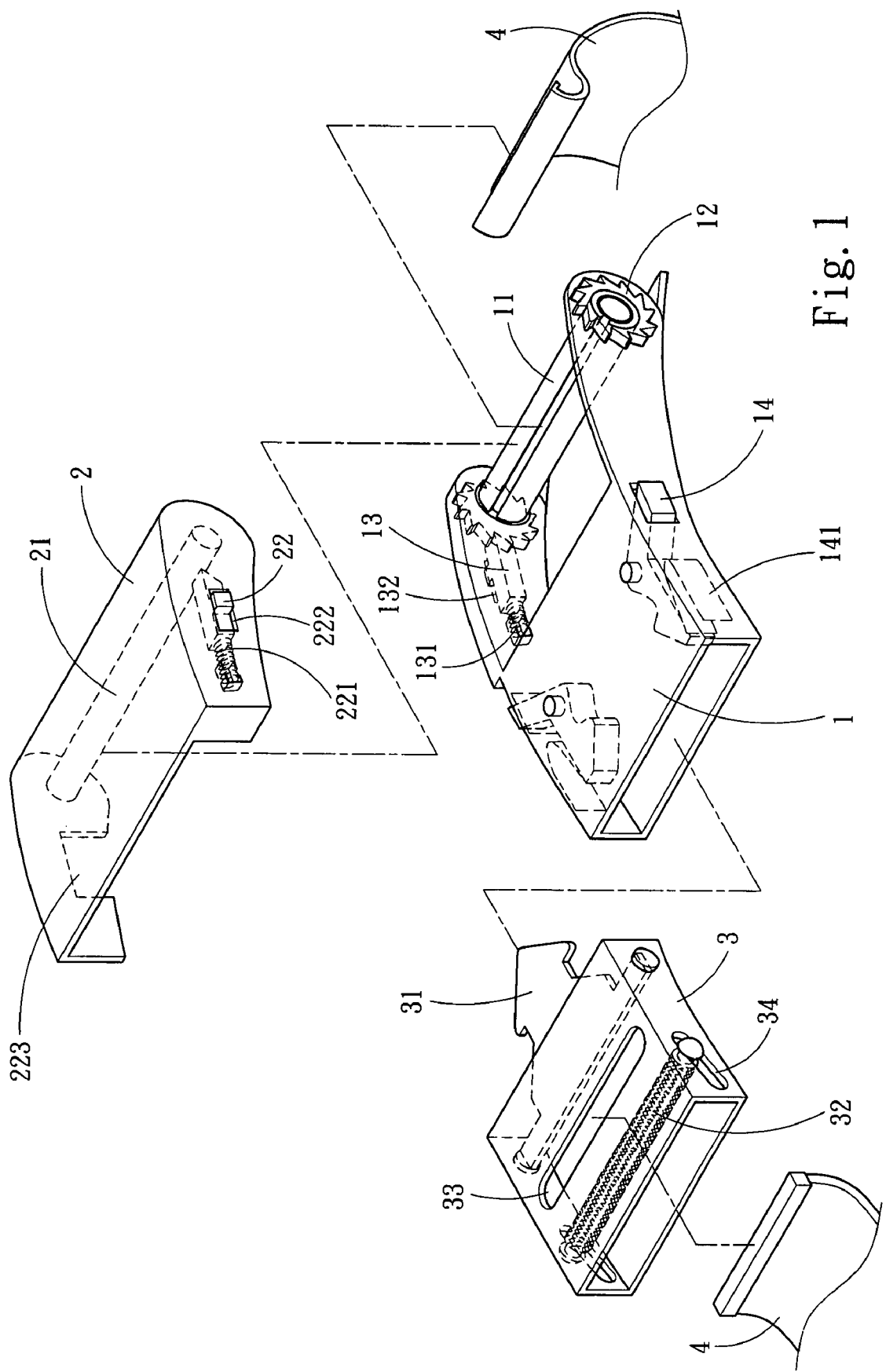
FIG. 1 is a decomposition drawing showing a preferred embodiment according to the present invention.
Figure 2A:
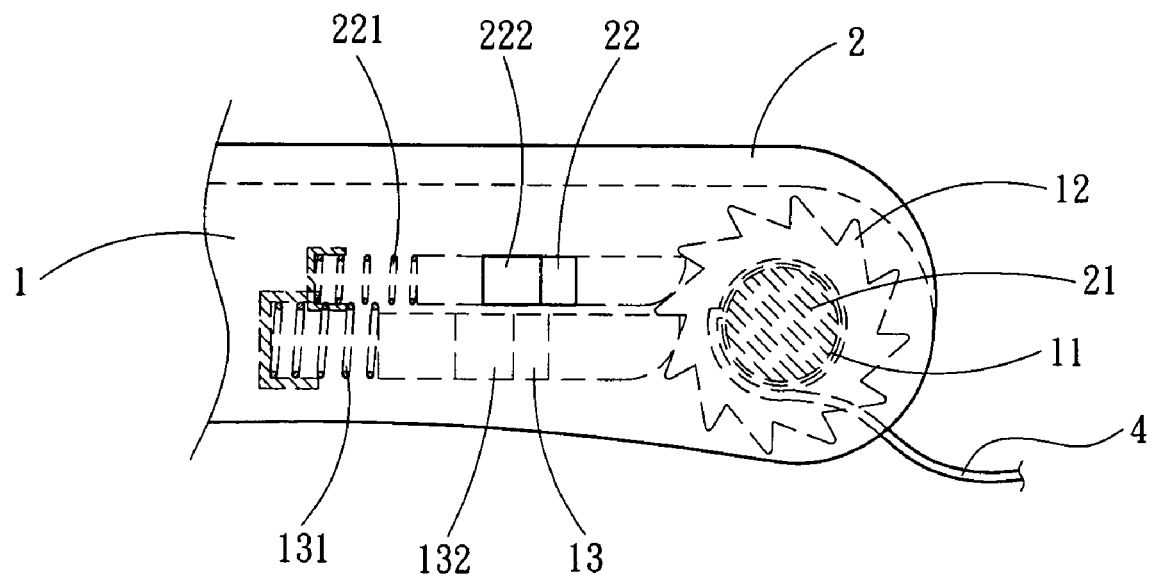
FIGS. 2A to 2D are schematic views showing the fine tuning mechanism according to the present invention.
Figure 2B:
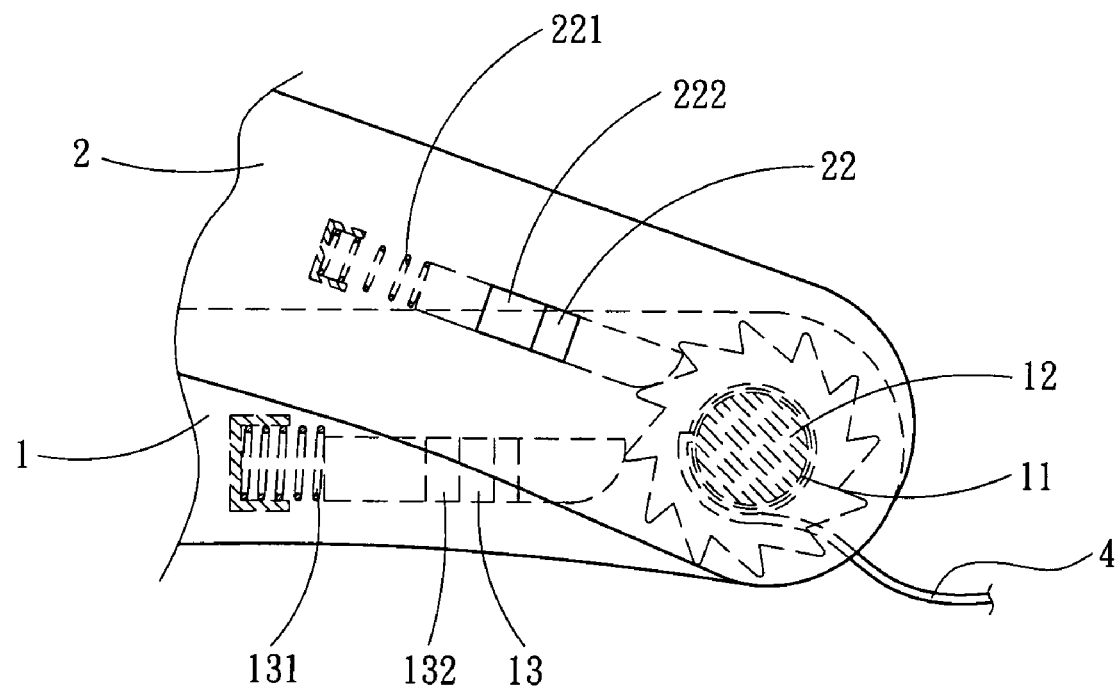
Figure 2C:
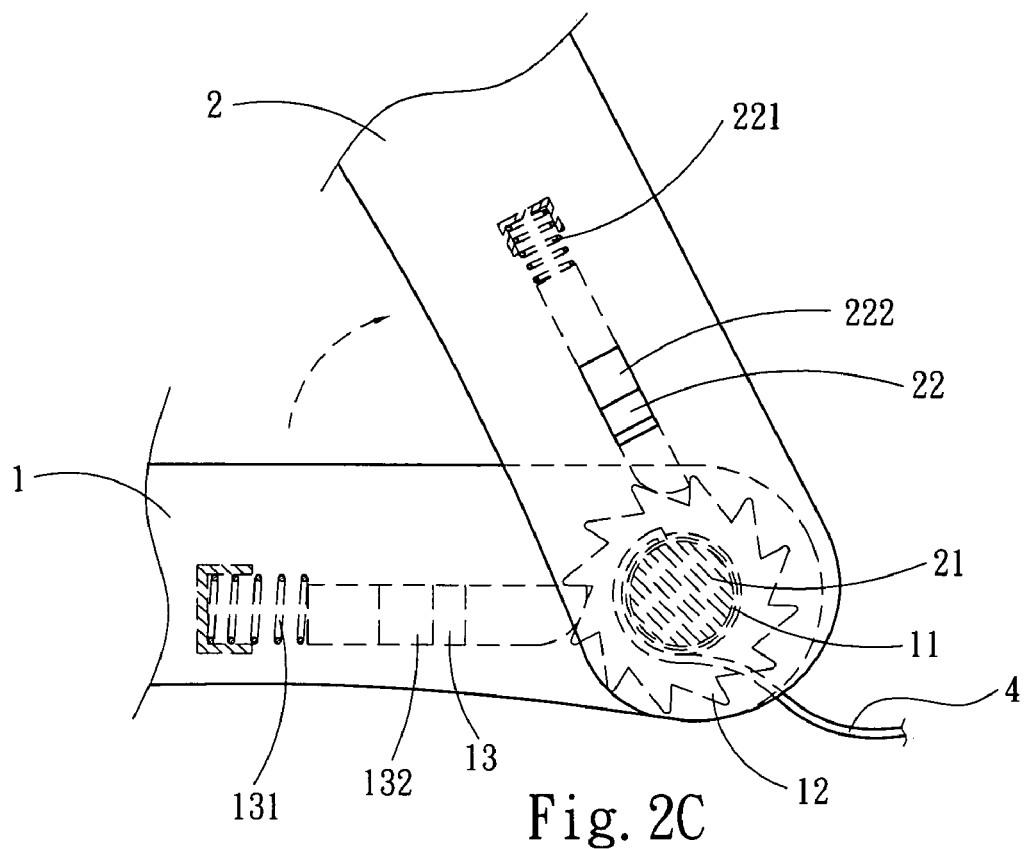
Figure 2D:
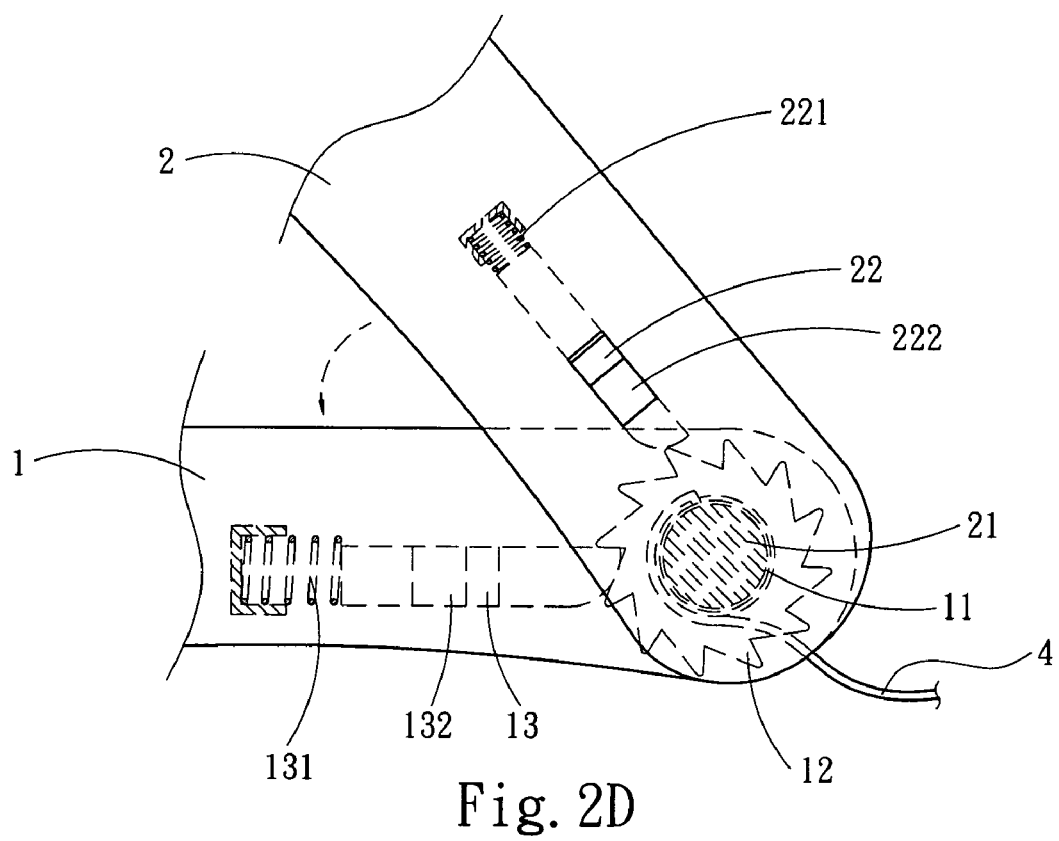

Please refer to FIG. 1, which is a decomposition drawing showing the preferred embodiment of the present invention. The belt structure includes a first housing 1, a second housing 2, a third housing 3 and a belt 4. The first housing 1 has an opening mounted at one end thereof, at least an engaging element 14 is mounted at the right and left sides of the opening, and an elastic piece 141 is mounted aside the engaging element 14 for biasing the engaging element 14. The third housing has a buckling element 31 at one end thereof which can be inserted into the opening of the first housing 1 and buckled with the engaging element 14 so as to connect the first housing 1 with the third housing 3, and the third housing also has an opening at the other end thereof for receiving therein the front end of the belt 4 and has a through hole 33 mounted thereon for extending the front end of the belt 4 out of the third housing 3. Moreover, the third housing 3 has a pressing shaft 32 mounted inside the opening thereof which can be removed in two pressing-shaft sliding troughs 34 mounted at the two sides of the third housing 3, so that when the belt 4 is pulled to have a proper length, the pressing shaft 32 can be moved to press and fix the belt 4, and preferably, the pressing shaft 32 can have some patterns on the surface thereof for increasing friction. Furthermore, a hollow axle pipe 11 and a resisting element 13 are mounted in the space at the other end of the first housing 1, wherein the resisting element 13 is located in the first housing at one side thereof and the first housing has a resisting-element window 132 formed thereon for exposing the resisting element 13, and also, two sides of the hollow axle pipe 11 have respectively mounted thereon a gear 12 and the gears 12 respectively have plural protruding teeth bent to an identical direction, the rear end of the belt 4 is fixed on the hollow axle pipe 11, and one end of the resisting element 13 extends toward the gears 12 and engages one of the gears 12 and the other end of the resisting element 13 has an elastic element biased thereon which is preferably a spring 131 so as to provide a recovering elasticity to the resisting element 13 as it moves. The second housing 2 has an axle pillar 21 at the position corresponding to the hollow axle pipe 11, so that the axle pillar 21 can extend into the hollow axle pipe 11 for connecting and also covering the second housing 2 to the first housing 1, and the axle pillar 21 and the hollow axle pipe 11 can be the axle center for achieving an upward turning. The second housing 2 also has a driving element 22 mounted therein at the side opposite to the resisting element 13 and the second housing 2 has a driving-element window 222 for exposing the driving element 22, and further, a protruding edge of the driving element 22 engages the gear 12 located at the other side of the hollow axle pipe and the other side of the driving element is biased by a spring 221, wherein the second housing 2 has an indentation 223 cut at the position corresponding to the resisting element 13 and the first housing 1 also has a resisting-element window 132 formed thereon for exposing the resisting element 13, so that the driving element 22 and the resisting element 13 can be manually moved at the two sides out of the second housing 2. Therefore, the first housing 1 and the second housing 2 can be connected through the hollow axle pipe 11 and the pillar 12, the two ends of the belt 4 are respectively connected to the first housing 1 and the third housing 3 and the third housing 3 and the first housing 1 are buckled together, so that a belt structure capable of surrounding human body can be formed. Then, through pressing the engaging element 14 of the first housing 1, the buckling element 31 of the third housing 3 can be released so as to separate the first housing 1 from the third housing 3.

The belt structure of the present invention also possesses the function of fine tuning of tightness, as shown in FIGS. 2A, 2B, 2C and 2D. As the first housing 1 and the second housing 2 are located at the original position, the resisting element 13 and the driving element 22 are simultaneously engaged with the gears 12 at the two sides, and when the user has the need to fine tune the tightness of the belt 4, he or she can pull up the second housing 2, and then, the driving element 22 will also be moved owing to the movement of the second housing 2, so that the driving element 22 will engage and move the gears 12, and since the plural protruding teeth are all bent toward one identical direction, the gears 12 can be turned along the moving direction of the driving element 22. Then, owing to the spring 131, the resisting element 13 can cooperate with the turning of the gears 12 to have a slightly backward movement, and when the gears 12 turn, the hollow axle pipe 11 will also turn, so that the belt 4 fixed on the hollow axle pipe 11 can be tightened. After the second housing 2 is moved, since the plural protruding teeth on the gears 12 are bent toward one identical direction, the driving element 22 can cooperate with the spring 221 to have a slightly backward movement, and thus, the second housing 2 can go back to the original position to cover the first housing 1. At the same time, the resisting element 13 in the first housing 1 still engages the gears 12 for maintaining the positions of the gears 12 and also the tightness of the belt 4. Therefore, through the second housing 2 being constantly pulled and homed to move the driving element 22, the belt 4 on the hollow axle pipe 11 can be gradually tightened. A mechanism for fine tuning the tightness is formed.

Figure 3:
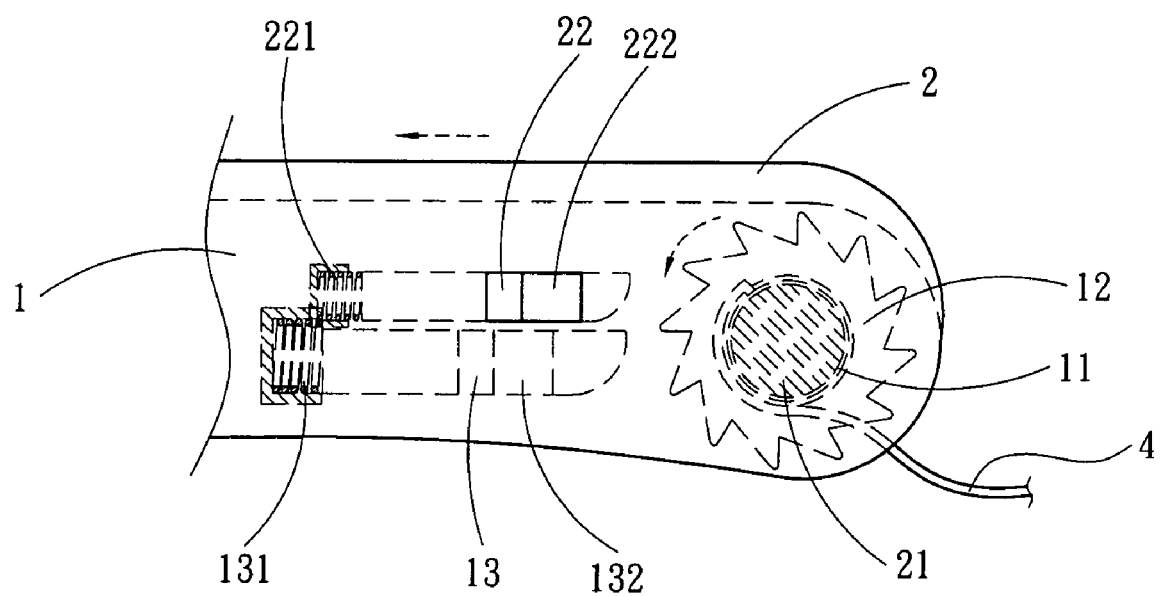
FIG. 3 is a schematic view showing the loosing of the gear.

Please refer to FIG. 3, when at the original position that the second housing 2 is covered on the first housing 1, the driving element 22 and the resisting element 13 can be simultaneously moved backward for loosing the gears 12 at the two sides at the same time, so that the gears 12 and the hollow axle pipe 11 can be turned back to the original position, and then, the belt 4 is loosed. Consequently, a mechanism for fine tuning the tightness of the belt 4 and fast loosing thereof is achieved.

The elastic element for biasing the driving element 22, the resisting element 13 and the engaging element 14 can be a spring or an elastic piece. Moreover, the first housing can be separated into two sub housings, which can be re-assembled, according to the different functions of buckling and fine tuning. Furthermore, a time alarm also can be mounted on the first, the second and the third housings. Besides, the integrally formed resisting element 13 also can be replaced by plural resisting elements 13 to respectively engage the gears 12.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A belt structure for binding a human body for first aid, comprising:
    a belt for surrounding the human body;
    a first housing, wherein the first housing has a hollow axle pipe at the front section thereof for fixing the front end of the belt, two gears are mounted on the hollow axle pipe, the first housing has a resisting element mounted therein for engaging one of the gears, the first housing has a resisting-element window for exposing the resisting element, the first housing also has a buckling trough mounted at the rear section thereof and an engaging element mounted therein, and the resisting element and the engaging element are respectively biased by an elastic element at one end thereof;
    a second housing, wherein the second housing is covered on the hollow axle pipe and also the resisting element of the first housing, the second housing has an axle pillar mounted therein for extending into the hollow axle pipe, the second housing has a driving element and an elastic element biasing the driving element both mounted thereinside, in which the driving element engages the other gear, the second housing has a driving-element window mounted thereon for exposing the driving element, and the second housing has in indentation mounted at the other side thereof; and
    a third housing, wherein the third housing has an opening for fixing the rear end of the belt and another opening for extending out thereof, the third housing also a pressing shaft for pressing and fixing the belt, and the third housing further has a buckling element at the other end thereof,
    wherein the two ends of the belt are respectively fixed at the first housing and the third housing and form a circular belt structure through the first housing and the third housing being buckled together, the second housing turns upwardly by using the axle pillar in the hollow axle pipe as the axle center so as to drive the gear by the driving element and also engaging and fixing the gear by the resisting element as the second housing is homed, and the engaging element and the buckling element respectively of the first housing and the third housing are capable of being released fast for separating the first housing and the third housing, so that a belt structure capable of being fast buckled and loosed and capable of fine tuning the level of tightness is achieved.

2. The belt structure as claimed in claim 1, wherein the resisting element and the driving element are simultaneously engaged to the gear, and when the second housing moves upward by taking the axle pillar and the hollow axle pipe as the axle center, the driving element also is moved to drive the turning of the ratch and the hollow axle pipe, thereby tightening the belt on the hollow axle pipe and also achieving a fine tuning mechanism.

3. The belt structure as claimed in claim 1, wherein the first housing has a buckling trough mounted at the rear section thereof for receiving the buckling element of the third housing, and the engaging element disposed in the buckling trough is buckled with the buckling element so as to connect the first and the third housings together.

4. The belt structure as claimed in claim 1, wherein through pressing the engaging element of the first housing to release the buckling element, the first housing and the third housing, which are originally buckled together, are separable.

5. The belt structure as claimed in claim 1, wherein the plural protruding teeth on the gear are bent toward one identical direction.

6. The belt structure as claimed in claim 1, wherein the elastic element for biasing the driving element 22, the resisting element 13 and the engaging element 14 is a spring.

7. The belt structure as claimed in claim 1, wherein the pressing shaft of the third housing further comprises patterns on the surface thereof for increasing friction, and the two ends thereof extend out of the third housing and manually moved to press and fix the belt.

8. The belt structure as claimed in claim 1, wherein the first housing is capable of being separated into two sub housings, which can be re-assembled, according to the different functions of buckling and fine tuning.

9. The belt structure as claimed in claim 1, wherein a time alarm is further mounted on the first housing, the second housing and the third housing.

\* \* \* \* \*